(No Model.)
E. W. CLEVELAND.
VEHICLE BRAKE.
No. 508,283. Patented Nov. 7, 1893.
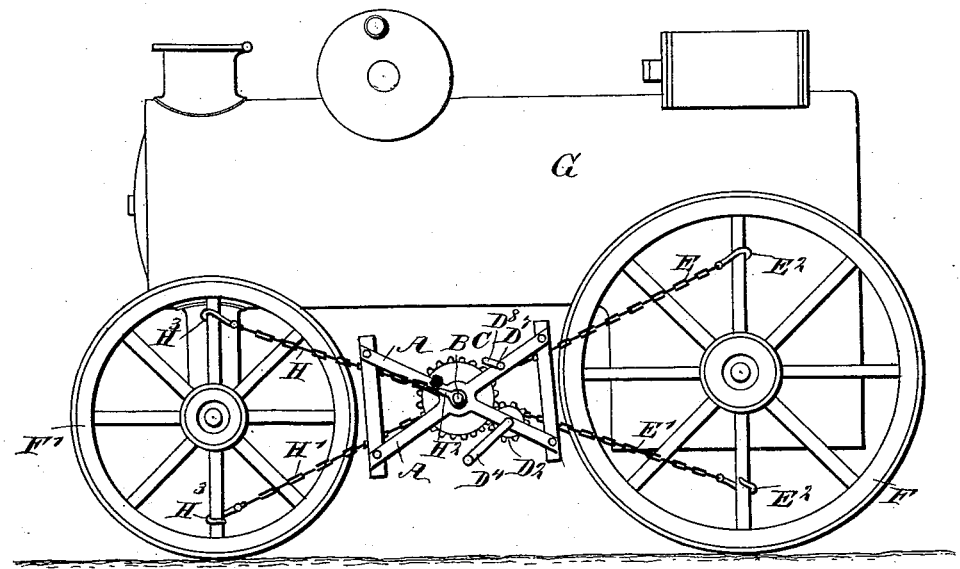
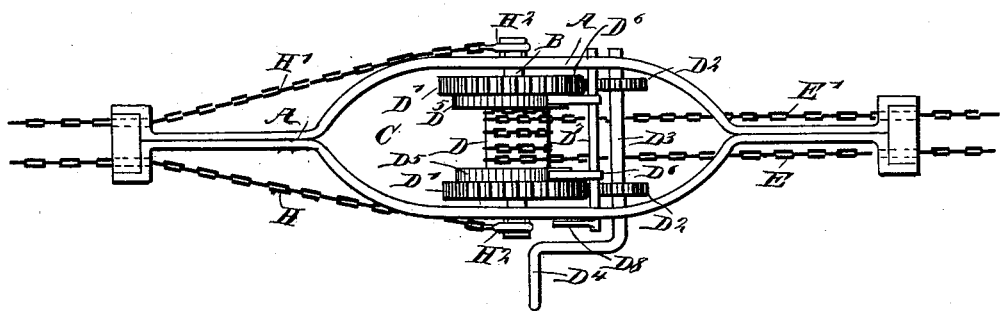
WITNESSES:
H. W. Walker
C. Sedgwick
INVENTOR
E. W. Cleveland
BY
Munn & Co.
ATTORNEYS.

UNITED STATES PATENT OFFICE.

EUGENE WYMAN CLEVELAND, OF ROUNTHWAITE, CANADA.

VEHICLE-BRAKE.

SPECIFICATION forming part of Letters Patent No. 508,283, dated November 7, 1893.

Application filed July 21, 1893. Serial No. 481,125. (No model.)

*To all whom it may concern:*

Be it known that I, EUGENE WYMAN CLEVELAND, of Rounthwaite, in the Province of Manitoba and Dominion of Canada, have invented a new and Improved Vehicle-Brake, of which the following is a full, clear, and exact description.

The object of the invention is to provide a new and improved vehicle brake which is simple and durable in construction, readily applied and more especially designed for use on portable engines and other vehicles.

The invention consists of a frame provided with a windlass and ropes adapted to be wound on the said windlass and adapted to engage the spokes of the vehicle wheel.

The invention also consists of certain parts and details, and combinations of the same, as will be hereinafter described, and then pointed out in the claims.

Reference is to be had to the accompanying drawings forming a part of this specification, in which similar letters of reference indicate corresponding parts in both the figures.

Figure 1 is a side elevation of the improvement as applied; and Fig. 2 is an enlarged plan view of the improvement.

The improved vehicle brake is provided with a suitably-constructed frame A in which is journaled the transversely-extending drum shaft B, of a windlass C of any approved construction, and arranged on the said main frame A. The drum D of the windlass C is connected with the chains E and E' formed or provided at their outer ends with hooks E$^2$ adapted to engage opposite spokes of one of the wheels F of the vehicle G, as plainly illustrated in Fig. 1. The ends of the shaft B on the outside of the frame A are engaged by eye bolts H$^2$ held on chains H and H' extending in an opposite direction to the chains E and E', and provided at their outer ends with hooks H$^3$ engaging opposite spokes of the forward wheel F' of the vehicle G. The windlass C is provided on its drum D with gear wheels D' in mesh with pinions D$^2$ secured on a transversely-extending driving shaft D$^3$ journaled in the main frame A and provided at its front end with a crank arm D$^4$ under the control of the operator to enable the latter to turn the said shaft D$^3$ to cause a revolving of the drum D to wind up the chains E and E'. On the drum D are also secured ratchet wheels D$^5$ engaged by pawls D$^6$ held on a transversely-extending rod D$^7$ likewise journaled in the main frame A and provided at one outer end with a handle D$^8$ adapted to be turned by the operator so as to throw the pawls D$^6$ in or out of mesh with the corresponding ratchet wheels D$^5$.

The operation is as follows: The main frame A is held between the wheels F and F' of the vehicle G and the hooks H$^3$ of the chains H and H' are attached to opposite spokes of the forward wheel F' as plainly shown in Fig. 1. The hooks E$^2$ of the other chains E and E' are likewise engaged with opposite spokes on the wheel F and then the operator turns the crank arm D$^4$ so as to actuate the windlass C to wind up the chains E and E' on the drum D until the chains are tightly stretched and consequently the wheels F and F' are securely locked in place and prevented from rotating. As illustrated in Fig. 1, the chains E and H' are in aligment with each other and cross the chains H and E', likewise arranged in aligment with each other. When it is desired to remove the brake from the vehicle the operator turns the handle D$^8$ upward so as to disengage the pawls D$^6$ from the ratchet wheels D$^5$ to permit the drum D to rotate in an opposite direction, so as to unwind the chains E and E'. As the latter become slack their hooks can readily be detached from the spokes of the wheel F and likewise the hooks H$^3$ of the chains H and H' can be unhooked from the spokes of the wheel F'. The entire device can then be stored away on the vehicle until it is again to be used for braking the vehicle on a down grade.

This device is very simple and durable in construction and can be readily applied or removed whenever desired.

Having thus described my invention, I claim as new and desire to secure by Letters Patent—

1. A vehicle brake comprising a frame, a windlass arranged on the said frame and chains adapted to wind on the said windlass and adapted to be engaged with opposite spokes of one of the wheels of the vehicle, substantially as shown and described.

2. A vehicle brake comprising a frame, a windlass arranged on the said frame, chains attached to and adapted to wind on the said windlass and adapted to be engaged with opposite spokes of a vehicle wheel, and a second set of chains arranged in opposite direction to the windlass chains and adapted to be engaged with another wheel of the vehicle, substantially as shown and described.

EUGENE WYMAN CLEVELAND.

Witnesses:
    CHAS. W. PETERSON,
    A. G. SCOTT.